United States Patent Office 3,493,242
Patented Feb. 3, 1970

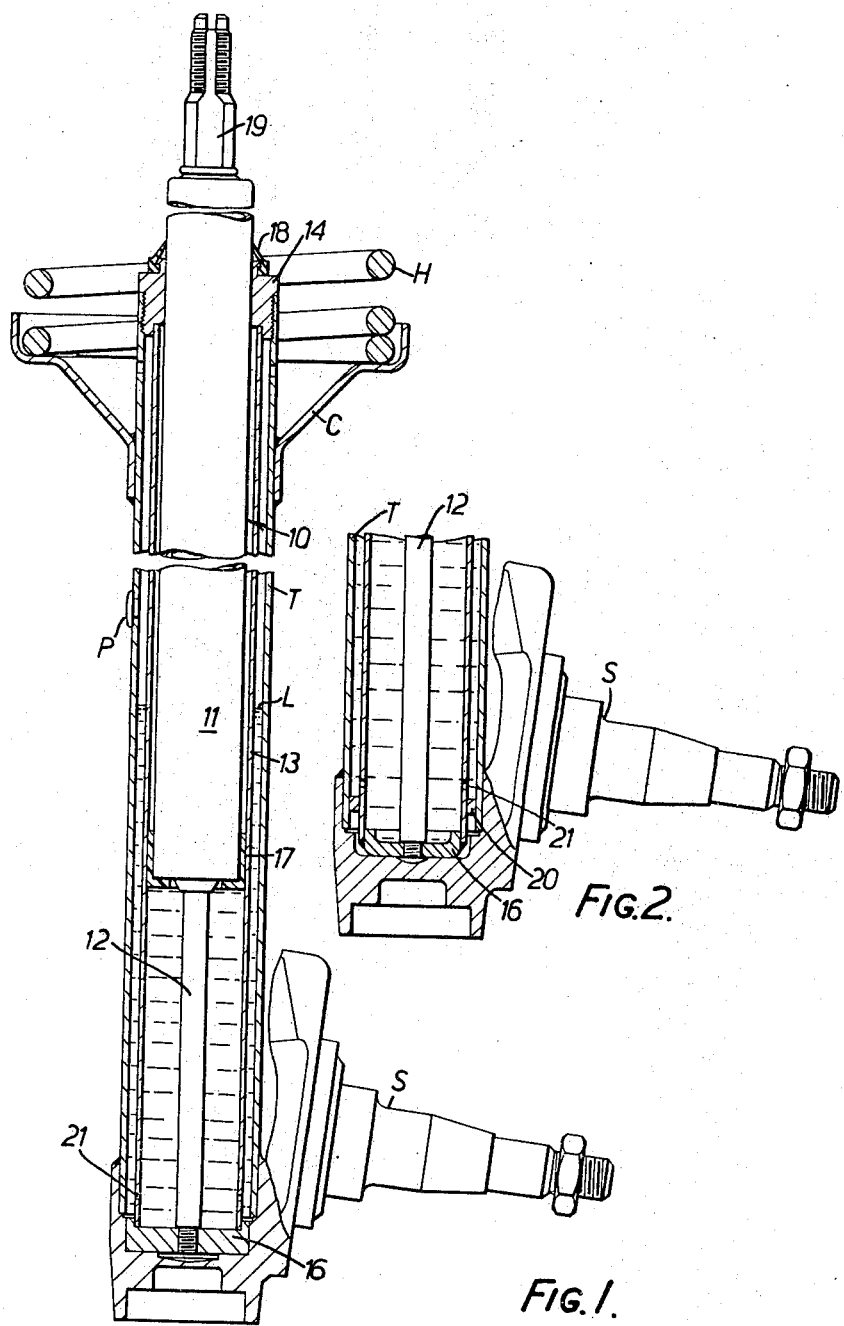

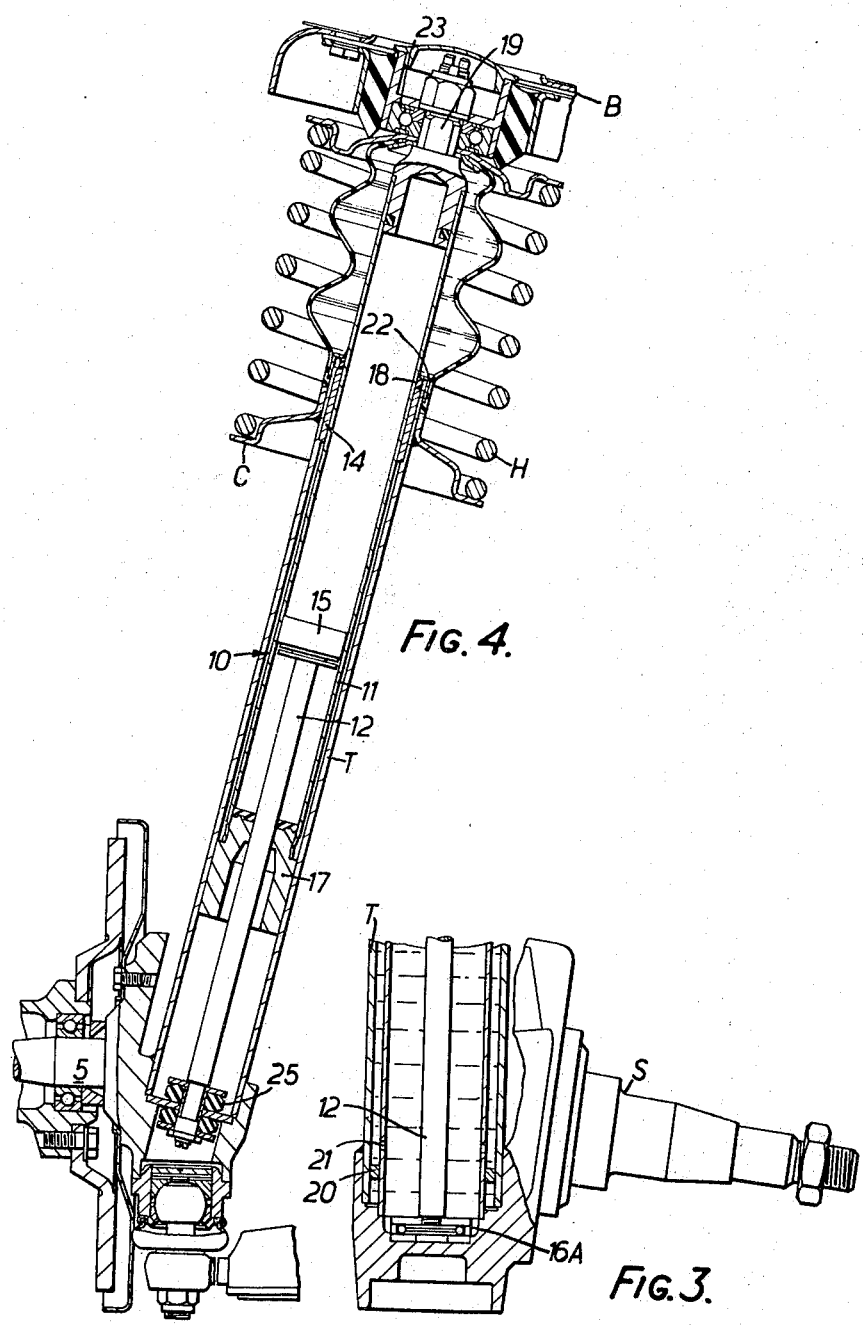

3,493,242
VEHICLE SUSPENSIONS
Lawrence G. Nicholls, Birmingham, England, assignor to Girling Limited, Birmingham, England
Filed Dec. 8, 1967, Ser. No. 689,018
Claims priority, application Great Britain, Dec. 15, 1966, 56,152/66; Jan. 27, 1967, 4,164/67
Int. Cl. B60g 15/06
U.S. Cl. 280—96.2    5 Claims

ABSTRACT OF THE DISCLOSURE

The invention relates to improvements in steerable suspension struts for motor vehicles.

Known struts of this kind have outer tubular bodies carrying at their lower ends stub axles for road wheels, and are provided internally with damper mechanisms having a piston rod projecting upwardly from the strut bodies and connected in use to the vehicle body. The invention resides broadly in inverting the damper mechanism, with the result that the piston rod is not subjected to bending loads, and may accordingly be smaller in cross-section, with a useful increase in effective areas of the damper piston. The damper is preferably independent (hydraulically) of the strut body, to facilitate initial manufacture or servicing or both.

---

The invention relates to vehicles suspension struts having the same general form and construction as the well-known McPherson strut, that is to say hydraulically damped suspension struts which carry at their lower ends stub axles which carry the steerable road wheels of a vehicle, the part carrying the stub axle being rotatable about the longitudinal axes of the struts to accommodate steering movement of the road wheels.

In the known McPherson strut, the outer body part (which at its lower end carries the stub axle) constitutes the outer reservoir tube of a twin tube damper, the inner tube of which contains a damper piston, and the piston rod of this piston projects at the top of the strut and has its upper end secured to the body of the vehicle.

In accordance with a feature of the present invention, however, the damper piston rod is connected to the lower end of the outer tube, so that bending stresses induced in the strut are transmitted not by the piston rod, but by the outer and inner tubes of the strut. The rod may thus be of substantially reduced diameter compared with known arrangements.

In accordance with a further feature, the inner tube, piston and piston rod constitute a self-contained damper, and the damper is preferably a single tube pressurised damper, and by arranging it in the inverted position, the gas in the damper cylinder is caused to accumulate in the closed upper end of the cylinder and the need to provide a separator piston in the cylinder may thus be obviated. A single tube pressurized damper has the advantage of having a damper piston of larger cross-sectional area than a twin-tube damper of the same outside diameter.

A strut in accordance with the invention can be so designed and built initially, but such a strut can also be constructed by modification of an existing strut of the general form and construction first described above. These struts are very successful and satisfactory in use, but the cost of servicing a strut tends to be high because of the expense of replacing the reservoir tube and stub axle.

The present invention accordingly further includes a partial replacement kit for converting an existing strut into a strut in accordance with the invention.

Some constructional forms of the invention will now be described, by way of example, with reference to the accompanying drawings, in which:

FIGURE 1 shows in sectional elevation a completed suspension strut in accordance with the invention;
FIGURE 2 shows a possible modification;
FIGURE 3 shows a further possible modification; and
FIGURE 4 shows another form of strut in accordance with the invention.

Throughout the drawings, corresponding parts of different embodiments are identified by the same reference numerals.

The strut shown in FIGURE 1 comprises a tubular strut body or reservoir tube T formed integrally at its lower end with a stub axle S, and carrying at its upper end a support cup C for a helical coil compression spring H. These four components are the original components of an existing McPherson strut, from which the internal components, principally the inner tube complete with its piston and piston rod, have been removed.

A partial replacement unit for the strut comprises a single tube pressurized damper 10, having a cylinder 11 and a piston rod 12, and guide means consisting of a guide tube 13 having top and bottom end fittings 14 and 16, and a bearing collar 17. The piston rod 12 of the damper is screwed into the bottom fitting 16, and the cylinder 11 is guided for axial movement relative to the guide tube 13 by means of the bearing collar 17 and the top fitting 14, which carries an oil scraper ring 18.

This preassembled unit is mounted in the reservoir tube T by locating the bottom fitting 16 in the lower end of the tube T, and screwing the top fitting 14 into the open upper end of the tube T. The cylinder 11 is secured to the body of the vehicle by means of a special fixing spigot 19 fast with the upper end of the cylinder.

The existing reservoir tube T has a hole closable by a plug P for occasional topping up of the damper liquid, but this hole may now be used for partially filling the reservoir tube with a lubricant, which has access to the interior of the guide tube 13 through apertures 21 for lubrication of the sliding surfaces between the bearing collar 17 and the interior of the guide tube, and between the top fitting 14 and the cylinder 11. The normal lubricant level is as indicated at L, but in use the reciprocation of the parts causes lubricant to be forced past the guide collar to reach the top fitting.

The replacement unit is insertable in the existing reservoir tube, without removing the latter from the vehicle, by first releasing the existing upper connections between the spring H and the original inner tube, swinging the whole strut sideways and removing the inner tube, and inserting and fixing in position the replacement unit, before swinging the reservoir tube back into its operating position, and reconnecting the spring and securing the cylinder 11 to the vehicle body.

FIGURE 2 shows a detail modification in which the bottom fitting 16 is formed by a single dome fitting secured and contained within the diameter of the guide tube and welded thereto, location of the lower end of the guide tube within the reservoir tube being ensured by a separate guide ring 20 welded or otherwise secured to the outside of the guide tube a short distance above the lower end thereof, the ring making sliding engagement inside the tube T.

In the illustrated embodiment, the piston rod 12 is fixed relative to the tube T, but the cylinder 11 can rotate relative to the tube T, and care is required to ensure that the damper piston seal can withstand the relative rotation.

In a modified embodiment of FIGURE 3, the rod 12 is arranged to rotate relative to the tube T by means of a thrust-race 16A, so that no relative rotation occurs between the piston rod 12 and the damper cylinder 11.

The strut shown in FIGURE 4 again comprises an outer tube T formed integrally at its lower end with a stub axle 5, and carrying at its upper end a support cup C for a helical coil compression spring H.

Mounted within the tube T is a self-contained, pressurized damper 10 having a cylinder 11, a piston 15, and a piston rod 12, which at its lower end is connected to the lower end of the tube T by a flexible coupling 25. The cylinder (or inner tube) 11 is guided for axial movement relative to the tube T by means of an upper top fitting or guide 14 and a bearing collar 17, both of which are preferably of sintered metal impregnated with lubricant. The collar 17 also acts as a piston rod guide. Optionally a scraper ring 18 located by a pressing 22 is provided about the cylinder 11.

At its upper end, the cylinder 11 is provided with an integral fixing spigot 19 fixed in the inner race of a rotary bearing 23, which locates the cylinder relative to the body B of the vehicle.

The coupling 25 between the piston rod 12 and the tube T permits relative angular displacement between the axes of the rod and the tube and may also allow relative rotation.

Apart from the details of the end couplings, the main differences between FIGURES 1 and 4 is that the strut shown in FIGURE 4 is initially designed and constructed as shown whereas the strut of FIGURE 1 is obtained by modifying an existing strut of conventional construction.

In a possible modification of the FIGURE 4 construction, the piston is rotatable within the damper cylinder, which is locked against rotation and a rotatable abutment is provided for spring H.

In all of the above described embodiments, the damper unit is described as being a pressurized single tube damper, but unpressurized single tube dampers and twin tube dampers could alternatively be employed.

I claim:

1. In or for a motor vehicle having a body and a ground wheel steerable relative to the body, an improved suspension strut comprising: a tubular strut body having at its lower end a stub axle for said wheel; a damper cylinder within said strut body; a damper piston rod emerging from said damper cylinder, said piston rod having a free and disposed adjacent said lower end of said strut body; means for transmitting thrust from said strut body to said piston rod; guide means on said strut body for permitting axial movement of said cylinder body relative to said strut body; means for connecting the upper end of said cylinder body to said vehicle body; said guide means comprising a guide tube inserted in said strut body concentrically between said damper cylinder and said strut body; means locating said guide tube at its lower end in said strut body at its lower end; top fitting means secured to said strut body at the upper end thereof to guide said cylinder body; and bearing means secured to said cylinder and sliding contact with said guide tube.

2. A suspension strut as claimed in claim 1, wherein said damper forms a self-contained unit hydraulically independent of said strut body.

3. A suspension strut as claimed in claim 2, wherein said damper is a single-tube, pressurized damper.

4. A suspension strut as claimed in claim 1, wherein said guide means comprises:

a guide bush securely mounted on said strut body for guiding said cylinder body axially relative thereto;

and an end closure member to the lower end of said cylinder body, said member acting as a guide for said piston rod and having sliding engagement in said strut body.

5. For the suspension unit of claim 1, a partial replacement kit comprising:

a self-contained telescopic damper having a cylinder and a piston rod emerging from one end of said cylinder;

a guide tube insertable in a strut body;

a top fitting for securing said guide tube in said strut body, said fitting adapted to receive and guide said cylinder;

a bottom fitting for attachment to the free end of said piston rod and transmitting thrust forces between said rod and said strut body;

and a guide bush for attachment to said one end of said cylinder and dimensioned for sliding engagement in said guide tube.

References Cited

UNITED STATES PATENTS

| 2,567,144 | 9/1951 | Butterfield | 280—96.2 |
| 2,624,592 | 1/1953 | MacPherson | 280—96.2 |
| 2,935,334 | 5/1960 | Felts | 280—96.2 |
| 2,992,013 | 4/1961 | Zeigler et al. | 280—96.2 |
| 3,346,272 | 10/1967 | Smith | 280—96.2 |

FOREIGN PATENTS

| 1,031,650 | 4/1965 | Great Britain. |

KENNETH H. BETTS, Primary Examiner

U.S. Cl. X.R.

267—60